United States Patent Office 3,038,244
Patented June 12, 1962

3,038,244
METHOD OF PRODUCING DISC-SHAPED MAGNETOGRAM CARRIERS WITH GUIDING GROOVE
Arne Bergne, Lidingo, Sweden, assignor to Svenska Aktiebolaget Gasaccumulator, Lidingo, near Stockholm, Sweden, a corporation of Sweden
No Drawing. Filed Feb. 25, 1959, Ser. No. 795,339
Claims priority, application Sweden Mar. 19, 1958
1 Claim. (Cl. 29—155.5)

It is known, amongst others from the German patent specification 607,882, in the production of plate-formed magnetogram carriers on a support of for instance plastic to attach a thin disc or a thin foil of magnetizable material, grooves being impressed into this magnetizable material at a later time, said grooves being intended to serve as guide grooves for the magnetic means with which recording or reproduction of the magnetogram shall take place from the magnetogram carrier. Such a method in the production of plate-formed magnetogram carriers of course is rather complicated, because two different times are required for the production, viz. firstly the fixture of the thin foil of magnetizable material, partly also the thereafter following impression of the guide groove.

In the said patent specification it is in first place proposed to use as magnetizable material a thin foil of steel, but it is evident to the man skilled in the art that as soon as other foil-shaped materials are produced within the technics, for instance the foils now usual, which contain a magnetizable powder, also such foils will be possible to attach to a support of plastic or similar material in the same way.

By the Swedish patent specification 143,408 one has proposed to avoid the complication, which consists in first attaching the foil and thereafter at a second time to impress the guide groove in the foil, by causing the attachment and the impressing at one single time.

A plate-formed magnetogram carrier according to the Swedish patent specification however, suffers under essential disadvantages. It is not avoidable that in the said method a strong heating will take place of the surface of the magnetogram carrier which is provided with magnetizable foil layer, and as further the strong heating on this side of the magnetogram carrier makes a more easy displacement of the separate particles in the magnetogram carrier possible under the impressing of the guide groove one can also not avoid that rather strong radial expansion forces are created in this surface, said expansion forces not corresponding to expansion forces which may eventually arise in the other surface of the disc. It has proved that if one tries to produce plate-formed magnetogram carriers in the said way, when using a thin material as support, this will cause so strong cupola strains that, as soon as an indication to bending of the disc is created, said disc will automatically turn over into a more or less cylinder envelope-formed position. The use of such a disc in a magnetogram recording apparatus of course is combined with rather great difficulties because the disc must in this apparatus be spanned out into even position. As a rule, however, one will want to use discs which are even per se. In order of avoiding the said disadvantage one has therefore also when executing the invention according to the said Swedish patent specification had to use a very thick plastic material in the disc, which would give the disc sufficient rigidity for avoiding such bending appearances as mentioned above. This, however, will on the other hand cause the disc to be heavy when starting, and it will have a high inertia when it shall be stopped, so that it will be difficult to transport and difficult to treat.

All these disadvantages are avoided according to the present invention, which consist in combining a foil made of plastic material, and containing powder of a magnetizable material, in even state on the one side of a support disc made of plastic, by heat attachment, preferably of the kind, used to be called plastic welding, said combining taking place in the same time as the impression of guiding grooves in the other side of same disc, which is thus not covered with magnetizable material. This causes that the two sides of the disc must be heated separately, and there will then be no difficulty to control the heating of each side in such a way, that the cupola extension strains, which would eventually be created when impressing the groove, will be equalized by corresponding strains on the other side of the disc. It has also proved in tests that one can in this way get a disc, which also after long treatment will be fully plane, and which, if it is compulsorily bent, will resume its plane state by its own elastic force.

What is claimed is:

A method of forming a magnetic carrier comprising simultaneously securing by heat attachment a magnetizable plastic foil to one side of a plastic support disc and forming a spiral guide groove in the other side thereof upon the application of heat thereto, thereby separately heating each of the two sides of the magnetic carrier, while separately controlling the heating of each side so that cupola extension strains created when impressing the guide groove are equalized by corresponding strains on the other side of the magnetic carrier and the surfaces of the magnetic carrier are maintained fully and completely plane during use, while if the surfaces of the magnetic carrier are compulsorily bent, the magnetic carrier will resume its said plane characteristic upon release of the bent force by the elastic force of equalized strains of the plastic support disc and the plastic foil secured thereto.

References Cited in the file of this patent
UNITED STATES PATENTS 2,716,268 Steigerwalt _____ Aug. 30, 1955

FOREIGN PATENTS 607,882 Germany _____ Jan. 9, 1935
143,408 Sweden _____ Dec. 22, 1953